June 3, 1947.  A. W. BRUCE ET AL  2,421,596
PRESSURE VESSEL
Filed July 21, 1945
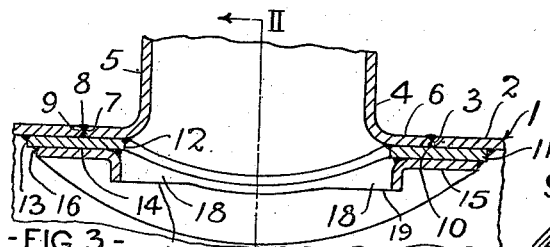
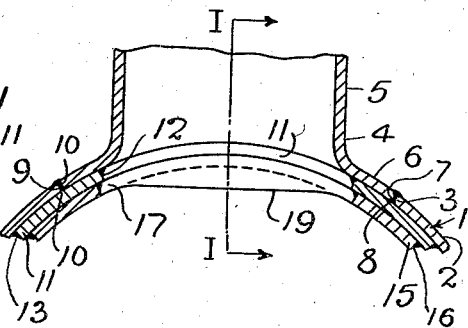
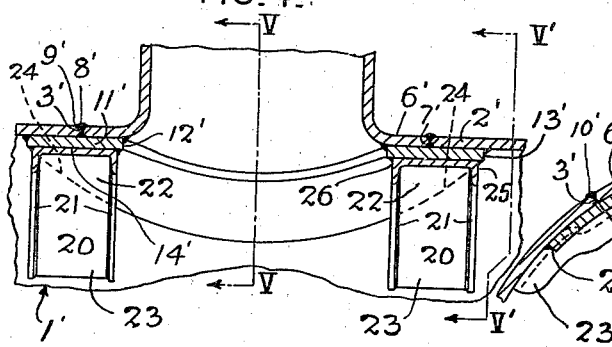
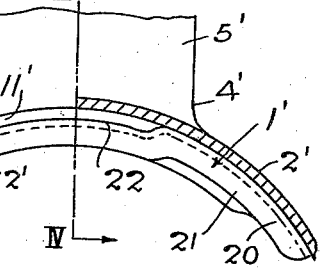
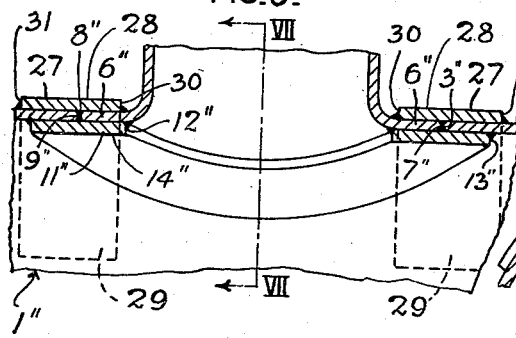
INVENTORS
Alfred W. Bruce
James Partington
BY S. C. Yeaton
ATTORNEY Patented June 3, 1947

2,421,596

UNITED STATES PATENT OFFICE 2,421,596

PRESSURE VESSEL

Alfred W. Bruce, New York, N. Y., and James Partington, East Orange, N. J., assignors to American Locomotive Company, New York, N. Y., a corporation of New York Application July 21, 1945, Serial No. 606,396

1 Claim. (Cl. 285—106)

This invention relates to pressure vessels.

The object of the present invention is to provide a pressure vessel having a fixture with a flange welded in an orifice in a concavo-convex portion of the vessel wall, and a welded reinforcement for the wall at the orifice of a character to prevent the vessel being weakened by the orifice.

Referring to the drawing forming a part of this application, Figure 1 is a sectional view, on the line I—I of Fig. 2, showing a portion of a pressure vessel constructed in accordance with this invention; Fig. 2 is a section on the line II—II of Fig. 1; Fig. 3 is an inverted plan of Fig. 1; Fig. 4 is a view similar to Fig. 1, taken on the line IV—IV of Fig. 5, of another embodiment of the invention; Fig. 5 is, at the left, a section on the line V—V, and at the right, a section on the line V'—V', of Fig. 4; Fig. 6 is a view similar to Fig. 1, taken on the line VI—VI of Fig. 7, of a further embodiment of the invention; and Fig. 7 is a section on the line VII—VII of Fig. 6.

Referring to Figs. 1 to 3, the pressure vessel 1 has a cylindrical wall 2 provided with a circular orifice 3. The circular orifice may be formed by making an oval hole in the vessel wall before the wall is shaped into a cylinder. A hollow fitting 4, having a member 5 extending upwardly and outwardly from the wall 2 and a flange 6 integral with the inner end of the member 5, is secured to the wall 2, the flange being disposed in the orifice 3 with its outer edge 7 bonded by a butt weld 8 to the defining edge 9 of the orifice 3.

The flange 6 is in line with the wall 2 and is shaped to form a cylindrical continuation thereof inwardly of the edge 9 of the orifice 3. The butt weld 8 is of the well-known type formed by filling two oppositely directed V-grooves 10 with weld metal, the V-grooves 10 having coinciding vertexes. The butt weld is continuous around the edges 7 and 9 and firmly secures and seals the flange 6 to the wall 2. Flange 6 replaces some of the strength of the wall 2 lost when the orifice 3 was formed and this replacing by flange 6 is augmented by the member 5 which reinforces the flange. While the member 5 is shown fragmentally, it will be understood that it may be part of any desired or well-known fitting appropriate for a pressure vessel.

The portion formed by the margins of the wall 2 and of the flange 6 adjacent the butt weld 8 is concavo-convex and this portion is covered on its inner concave face by a liner or ring 11 conforming in shape to and engaging this portion. Ring 11 completely overlaps the butt weld and is concavo-convex, similar to the portion it covers. The inner edge 12 of the ring 11 is disposed outwardly of the member 5 and is fillet welded to the flange. The outer edge 13 is fillet welded to the wall 2. Ring 11 reinforces the wall 2 at the orifice 3 and conceals the butt weld at one side thereof, and this side of the butt weld may be ground flush so that ring 11 may closely engage the flange 6 and wall 2. This ring 11 further replaces some of the strength of wall 2 lost when the orifice 3 was formed.

The inner concave face 14 of ring 11 is partly covered by another liner or ring 15 which is in overlapping relation to the butt weld 8, leaving part of the ring 11 exposed at each edge of the ring 15. The outer edge 16 of the ring 15 is fillet welded to the concave face 14 of ring 11. The ring 15 has an inner edge 17. A segmental flange 18 extends into the vessel from this inner edge 17. There are two opposed flange segments with their maximum depth opposed on the longitudinal vertical center plane of the wall 2. The bottom edges 19 of the segments are in the same horizontal plane and the segments run out at their ends slightly before reaching the transverse vertical center plane of the wall 2 through the center of the orifice 3. The edge 17 is fillet welded to the concave face of the ring 11, this fillet weld being partly above the flange 18 as shown in Fig. 1.

The ring 15 further replaces some of the strength of wall 2 lost in forming the orifice 3. This replacing is augmented by the flange 18 which strengthens the ring 15 and further forms transverse webs, as is clearly shown in Fig. 2.

In the two other embodiments of the invention shown respectively in Figs. 4 and 5 and Figs. 6 and 7, parts corresponding to similar parts of the embodiment of Figs. 1 to 3 are indicated by like references with one and two accents respectively added.

In the embodiment of Figs. 4 and 5, the ring 15 is omitted and in place thereof two reinforcing members in the form of two longitudinally spaced cylindrically curved bands 20 are employed, the bands 20 being disposed on opposite sides of the orifice 3'. Each band 20 is channel-shaped in cross section, having two flanges 21. However, bands having no flanges or having only one flange, may be employed if desired. The bands 20 and their flanges 21 extend transversely of the wall 2'. Each band has an intermediate portion 22 conforming to and engaging the overlying portion of the concave face of the ring 11' in overlapping relation to the butt weld 8'. Each band 20 extends beyond the ring 11' and the extensions 23 conform to and engage the inner concave face of the wall 2'. Thus bands 20 are stepped at the outer edge 13' of ring 11', providing shoulders 24 (Fig. 5). The outer and inner edges 25 and 26 of each band are fillet welded at the intermediate portion 22 to ring 11' and at the extensions 23 to the wall 2'.

In the embodiment of Figs. 6 and 7, the ring 15 is omitted and in place thereof two reinforcing members in the form of two longitudinally spaced bands 27 are employed, the bands being disposed on opposite sides of the orifice 3". Each band is a cylindrically curved strip of metal rectangular in cross section. The bands 27 extend transversely of the wall 2" exteriorly thereof. Each band has an intermediate portion 28 overlying, conforming to and engaging a portion of the convex face of the flange 6" and wall 2", and overlapping the adjacent portion of the butt weld 8". Bands 27 have portions 29 that extend beyond the ring 11", as is clearly shown in Fig. 6. The inner edge 30 of each band 27 is fillet welded to the adjacent portions of the flange 6" and wall 2" and the outer edge 31 of each band 27 is fillet welded to the adjacent portion of the wall 2".

Bands 20 and 27 reinforce the walls at the orifices of their respective vessels in the same manner as ring 15. In each of the three embodiments of the invention shown, the wall of the vessel is reinforced at the orifice therein by a plurality of reinforcing members. It is contemplated that these reinforcing members will be proportioned so as to result in the wall of the vessel in each instance being at least as strong as it was before the orifice was formed therein.

In all three embodiments shown in the drawing, the butt weld is stepped from the other welds, leaving the butt weld free to be X-rayed, if desired. The reinforcement of the vessel wall at the orifice therein is effected with a minimum of concentration of weld metal at any one point and provides maximum flexibility to permit breathing of the wall of the vessel.

While there have been hereinbefore described approved embodiments of this invention, it will be understood that many and various changes and modifications in form, arrangement of parts and details of construction thereof may be made without departing from the spirit of the invention, and that all such changes and modifications as fall within the scope of the appended claim are contemplated as a part of this invention.

The invention claimed and desired to be secured by Letters Patent is:

A pressure vessel comprising a cylindrical wall having an orifice; a hollow cylindrical fitting normal to said wall having a lateral flange in said orifice with its outer edge butt-welded to the defining edge of said orifice, the portion of said vessel adjacent said butt weld at each side thereof being concavo-convex, the concave face being inwardly of said vessel; and a plurality of members reinforcing said wall at said orifice, said portion and said members being conformed and welded one to another, one of said members being an unflanged concavo-convex ring disposed within said vessel and being of slightly greater diameter than and overlapping said butt weld and conforming to and engaging said concave face, and welded at its outer and inner edges respectively to said wall and flange, and another of said members being a ring disposed within said vessel having a strengthening flange extending at an angle from the inner edge thereof, said flanged ring conforming to and engaging the concave face of said first mentioned ring in overlapping relation to said butt weld and welded at its outer and inner edges to said concave face of said first mentioned ring, the flange of said flanged ring extending inwardly into said vessel.

ALFRED W. BRUCE.
JAMES PARTINGTON.

REFERENCES CITED

The following references are of record in the file of this patent:

UNITED STATES PATENTS

| Number | Name | Date |
| --- | --- | --- |
| 1,290,091 | Cole | Jan. 7, 1919 |
| 1,123,309 | Kicklighter | Jan. 5, 1915 |
| 2,280,150 | Hasse et al. | Apr. 21, 1942 |

FOREIGN PATENTS

| Number | Country | Date |
| --- | --- | --- |
| 654,037 | France | Mar. 30, 1929 |
| 279,713 | Great Britain | 1927 |